(12) United States Patent
George et al.

(10) Patent No.: US 8,382,383 B2
(45) Date of Patent: Feb. 26, 2013

(54) STRUCTURE FOR OPTICAL CONNECTOR FERRULE AND METHOD FOR MAKING

(75) Inventors: Nicholas Claude George, Richmond, TX (US); Greyson Orval Knapp, Houston, TX (US)

(73) Assignee: PGS Geophysical AS, Lysaker (NO)

( * ) Notice: Subject to any disclaimer, the term of this patent is extended or adjusted under 35 U.S.C. 154(b) by 194 days.

(21) Appl. No.: 12/802,509

(22) Filed: Jun. 8, 2010

(65) Prior Publication Data

US 2010/0322565 A1  Dec. 23, 2010

Related U.S. Application Data

(60) Provisional application No. 61/219,481, filed on Jun. 23, 2009.

(51) Int. Cl.
*G02B 6/36* (2006.01)
*G02B 6/38* (2006.01)

(52) U.S. Cl. ............ 385/72; 385/78; 385/81; 385/84; 385/86

(58) Field of Classification Search ............ 385/72, 385/78, 81, 84, 86
See application file for complete search history.

(56) References Cited

U.S. PATENT DOCUMENTS

| | | | |
|---|---|---|---|
| 3,917,383 A | 11/1975 | Cook et al. | |
| 4,056,305 A | 11/1977 | McCartney et al. | |
| 6,022,150 A * | 2/2000 | Erdman et al. | 385/81 |
| 6,591,025 B1 | 7/2003 | Siems et al. | |
| 6,648,520 B2 | 11/2003 | McDonald et al. | |
| 6,827,597 B1 | 12/2004 | Metzbower et al. | |
| 7,012,853 B2 | 3/2006 | Iseli et al. | |
| 7,048,446 B2 | 5/2006 | Rondeau et al. | |

FOREIGN PATENT DOCUMENTS

WO  2010151292 A1  12/2010

* cited by examiner

*Primary Examiner* — Brian Healy
*Assistant Examiner* — Mary El Shammaa (57) ABSTRACT

A ferrule structure for an optical connector includes a central member disposed in the ferrule. The central member is configured so that an exterior dimension of the central member can change between a smaller size and a larger size. A plurality of optical fibers are disposed in the ferrule externally to the central member. A method for assembling an optical connector ferrule includes providing a central member, wherein the central member is configured so that an exterior dimension of the central member can change between a smaller size and a larger size. The method further includes placing an axial load on the central member to cause the exterior dimension to assume the smaller size. The central member is disposed in the ferrule. A plurality of optical fibers are disposed in the ferrule, external to the central member. The axial load is removed from the central member.

20 Claims, 7 Drawing Sheets

Stressed

FIG. 6C

Relaxed

STRUCTURE FOR OPTICAL CONNECTOR FERRULE AND METHOD FOR MAKING

CROSS-REFERENCE TO RELATED APPLICATIONS

This application claims the benefit of U.S. Provisional Patent Application Ser. No. 61/219,481, filed on Jun. 23, 2009, which is herein incorporated by reference.

STATEMENT REGARDING FEDERALLY SPONSORED RESEARCH OR DEVELOPMENT

Not applicable.

BACKGROUND OF THE INVENTION

The invention relates generally to the field of optical fiber signal communication. More specifically, the invention relates to structures for terminals in a connector used to join segments of an optical fiber cable and methods of utilizing same.

Optical fibers are used in cables to transmit signals in the form of modulated light along the cable. Often, a single cable may carry a dozen or more optical fibers. The cable may have a preselected length with optical connectors on one or both ends. The optical connectors are used to join one cable to another while making optical connection between corresponding optical fibers in each cable. Consequently, the optical connectors should provide secure optical connections (i.e., providing a high transmission rate) between corresponding optical fibers. Ideally, an optical connector would provide such connections for each pair of corresponding fibers in a single step.

U.S. Pat. No. 6,827,597 issued to Metzbower et al. shows one type of optical cable connector. In connectors such as the one shown in the '597 patent, each optical fiber that is to be optically coupled to a corresponding fiber is held in place in the connector body by an individual ferrule. Each ferrule may be spring loaded from the connector body end so that when the corresponding connectors are mated, the corresponding fiber ends are urged into contact with each other with a preselected biasing force.

As optical cables are made with increasing numbers of fibers, suitable optical connectors for such cables becomes increasingly large and cumbersome because one ferrule is used for each optical fiber, and thus the size of the connector body increases accordingly.

Equipment for geophysical surveying of subterranean formations may utilize optical fibers for signal transmission. Optical signals may advantageously avoid electromagnetic interference problems which would accompany electrical signals. This may be particularly advantageous given the cable lengths required in typical surveys. Equipment for geophysical surveys could benefit from smaller, less complex, more reliable, and more cost efficient optical connectors.

There exists a need for an optical connector that can couple larger numbers of optical fibers between cables without the need for corresponding increase of the size of the connector body.

SUMMARY OF THE INVENTION

A ferrule structure according to one aspect of the invention includes a central member disposed in the ferrule, wherein the central member is configured so that an exterior dimension of the central member can change between a smaller size and a larger size. A plurality of optical fibers is disposed in the ferrule externally to the central member. A method for assembling an optical connector ferrule according to another aspect of the invention includes providing a central member, wherein the central member is configured so that an exterior dimension of the central member can change between a smaller size and a larger size. The method further includes placing an axial load on the central member to cause the exterior dimension to assume the smaller size. The central member is disposed in the ferrule. A plurality of optical fibers is disposed in the ferrule, wherein the optical fibers are disposed external to the central member. The axial load is removed from the central member.

An optical connector for marine geophysical surveys according to yet another aspect of the invention comprises at least one ferrule. Each ferrule comprises a central member disposed in the ferrule, wherein the central member is configured so that an exterior dimension of the central member can change between a smaller size and a larger size, and an axial load on the central member causes the exterior dimension to assume the smaller size. Each ferrule also comprises a plurality of optical fibers disposed in the ferrule external to the central member.

Other aspects and advantages of the invention will be apparent from the following description and the appended claims.

DETAILED DESCRIPTION

As described in U.S. Pat. No. 6,827,597 issued to Metzbower et al., which is herein incorporated by reference, optical connectors typically require a mechanism for securing the orientation and location of the optical fibers. The present invention works with optical connectors to retain the optical fibers in position to make optical contact with corresponding optical fibers in the mating part of the connector. Ferrules according to embodiments of the invention may be made from a ceramic material, a metal, or any other suitable material. For example, steel ferrules generally known in the telecommunications industry as "LC" or "MU" may be used, although the type of ferrule is not a limitation on the scope of the present invention. The ferrule may also be derived from connector types known in the art having, for example, outside diameters of about 1.25 mm, 2.0 mm, or 2.5 mm. In other embodiments, the ferrule may be of a user-specified shape and diameter.

Figure 1:
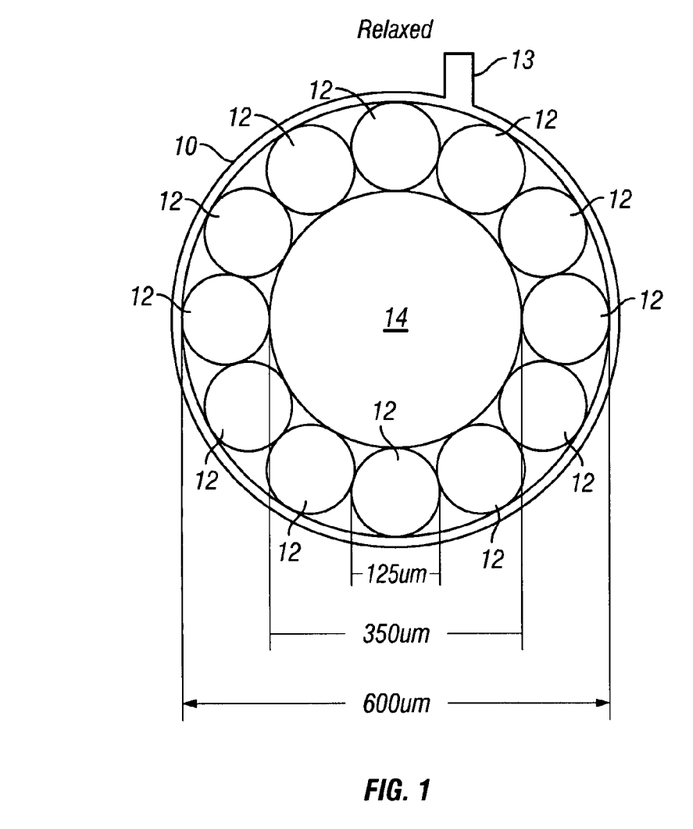
FIG. 1 shows an example optical connector ferrule wherein twelve optical fibers are frictionally held in place by an expandable central member.
Figure 2:
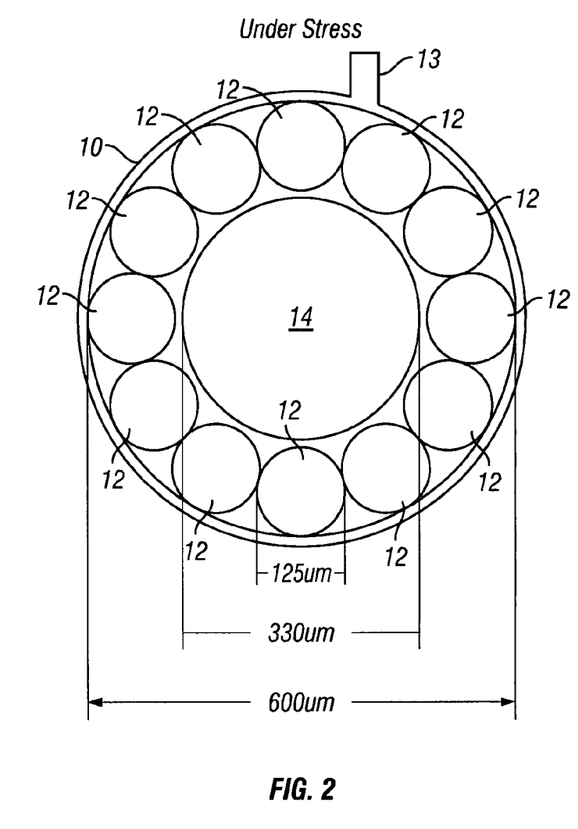
FIG. 2 shows the example ferrule of FIG. 1 wherein the central member is stressed to reduce its diameter, thus enabling insertion of the fibers into the ferrule.

FIG. 1 shows an example ferrule 10 having therein twelve optical fibers 12 disposed around a central member 14. As will be further discussed, the specific number and dimensions of optical fibers 12 may vary, and the dimensions of the ferrule 10 and central member 14 may vary to accommodate the required optical fiber configuration. The assembly in FIG. 1 shows the central member 14 in the absence of an axial load. The central member 14 may be, for example, a solid wire, a tube, a straight wire, a helically wound wire, or a shape memory alloy structure (such as a helically wound wire, explained further below). In many embodiments, the material from which the central member 14 is made enables the central member 14 to reduce in size under an axial load to a sufficient degree to enable insertion of the fibers 12 into the ferrule 10 as shown in FIG. 2. In some embodiments, central member 14 is made from an ultra elastic nickel-titanium memory metal alloy known as Nitinol. In other embodiments, central member 14 is made from a material having an elastic nanostructure. In still other embodiments, the central member is made from a rigid epoxy. In some embodiments, the central member is created by an injection molding process. Returning to FIG. 1, after the axial load is removed from the central member 14, the central member 14 expands in size, thereby applying a radial force to the optical fibers 12 against the interior of the ferrule 10. The optical fibers 12 are, thereby, retained in place between the central member 14 and the ferrule 10. The ends of the fibers so retained may be inspected, for example, microscopically to determine their rotational alignment. After the alignment is determined, an orientation key 13 may be affixed to or formed in the exterior of the ferrule 10. Examples of implementations of an orientation key include crimping, adhesive bonding, and swaging. A corresponding receptacle (not shown) in the connector body (not shown) may engage the orientation key 13 so that the multiple optical fibers 12 in the ferrule are disposed in a known rotary orientation. In some embodiments, orientation key 13 will actually be a notch or negative space created in ferrule 10 into which a tooth from the connector body (not shown) is inserted.

Figure 3:
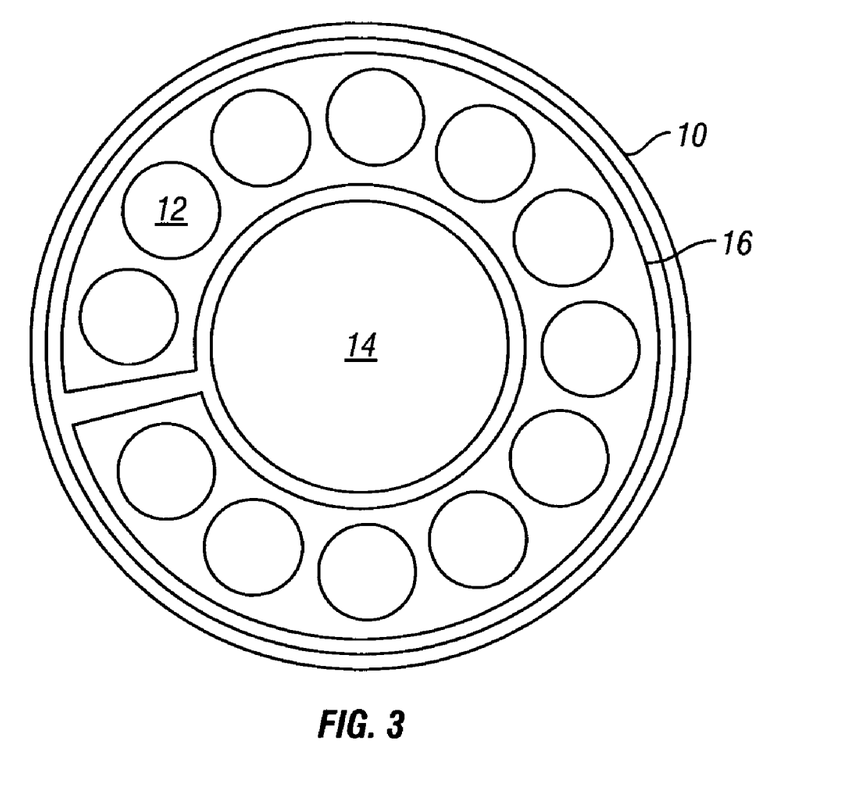
FIG. 3 shows an example ferrule with a twelve fiber ribbon wrapped around an expandable central member.

FIG. 3 shows another example wherein a fiber ribbon 16 includes twelve optical fibers disposed in an embedding material. The fiber ribbon 16 may be wrapped around the central member 14, and both fiber ribbon 16 and central member 14 may be inserted into the ferrule 10. The central member 14 may then have the axial load relieved. The fiber ribbon 16 will then be retained inside the ferrule 10 by friction.

Figure 4A:
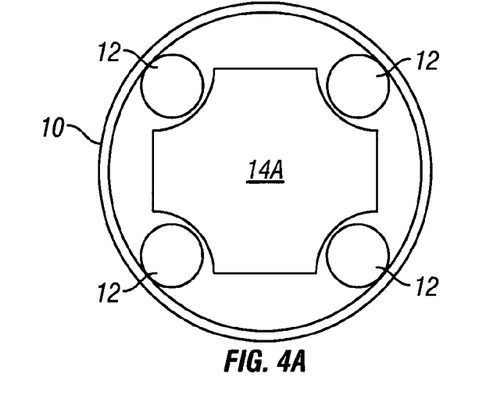
FIGS. 4A and 4B show example ferrules with another form of central member in stressed and relaxed states, respectively.
Figure 4B:
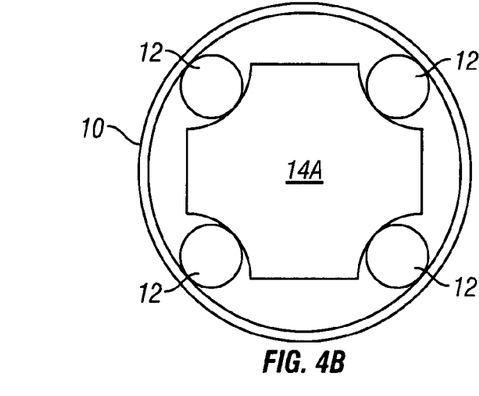
Figure 5A:
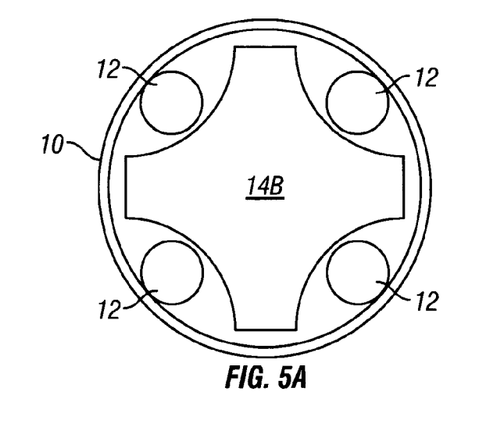
FIGS. 5A and 5B show example ferrules with another form of central member in stressed and relaxed states, respectively.
Figure 5B:
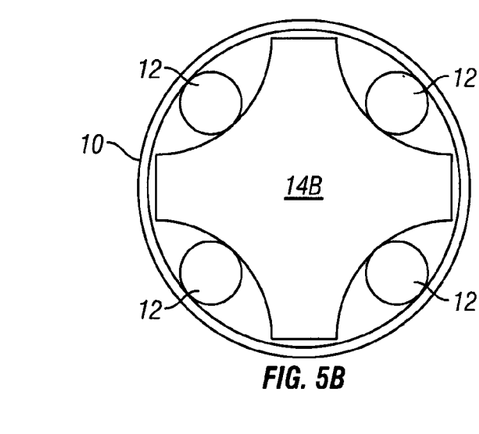

FIGS. 4A and 4B show, respectively, an alternative example of the central member in stressed and relaxed conditions. As can be observed in the figures, the central member 14A need not be circular in cross section as in the previous examples, but may have a cross section suited to retain the optical fibers 12 in a particular position about the exterior of the central member 14A. FIGS. 5A and 5B show stressed and relaxed states of a differently shaped central member 14B, respectively. Is should be understood that the shape of a cross-section of central member 14 may vary, for example a circle, a triangle, a square, a pentagon, a hexagon, a regular polygon, or an irregular polygon.

Figure 6A:
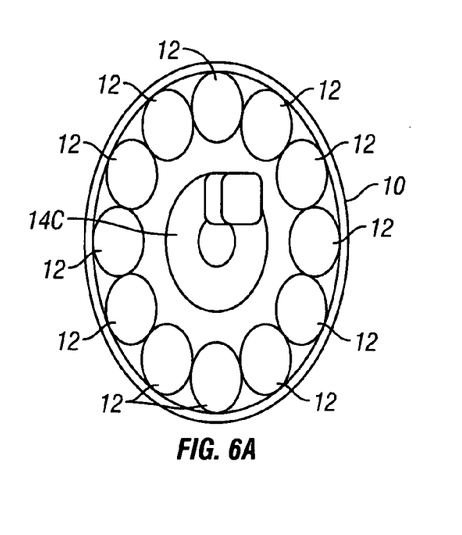
FIG. 6A shows an example ferrule using shape memory alloy as the central member in a stressed state.
Figure 6B:
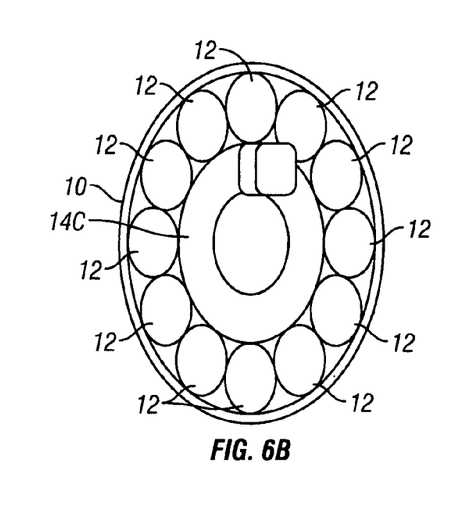
FIGS. 6B and 6D show the same elements of FIGS. 6A and 6C, wherein the central member is relaxed, respectively.
Figure 6C:
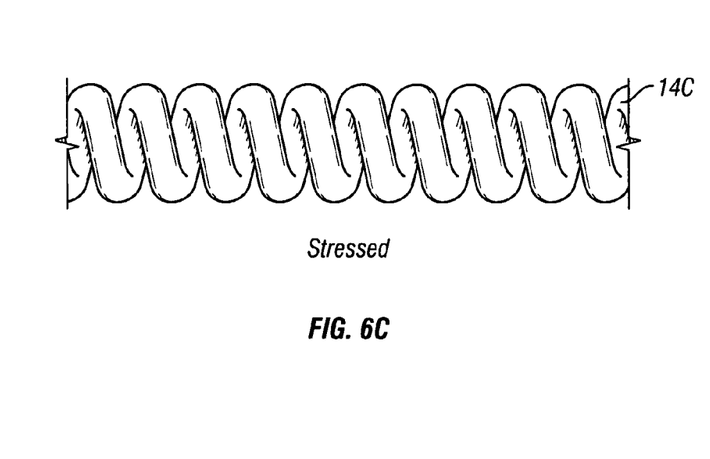
FIG. 6C shows a side view of the central member of FIG. 6A
Figure 6D:
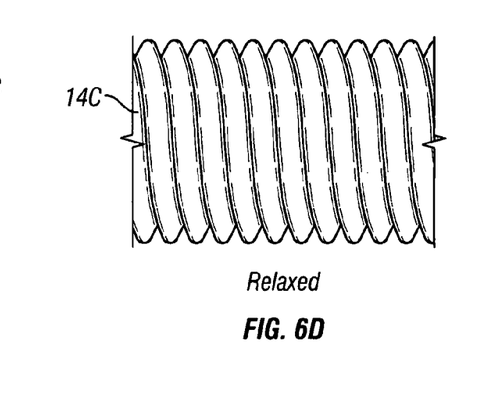
Figure 7A:
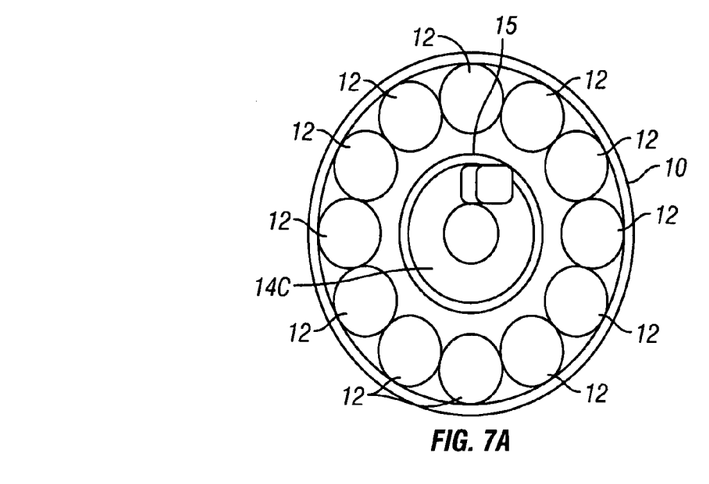
FIGS. 7A through 7D show similar structures to those shown in FIGS. 6A through 6D, with the addition of a coating on the central member.
Figure 7B:
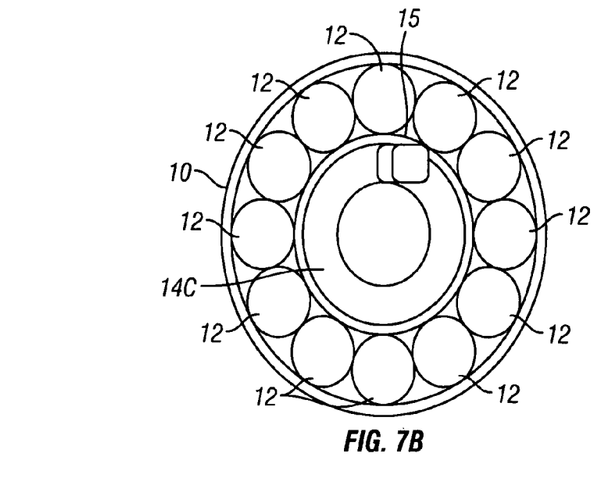
Figures 7C, 7D:
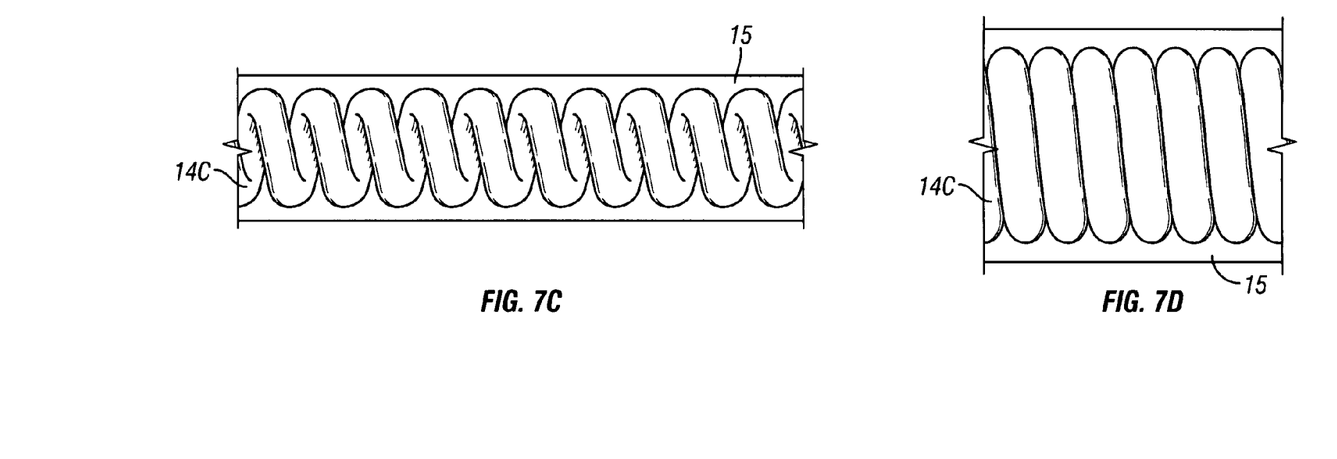

FIG. 6A shows an end view of a ferrule 10 having a plurality of optical fibers therein in which the central member 14C may be a helically wound spring, made for example from shape memory alloy, spring steel, or other suitable spring material. A side view of the central member 14C of FIG. 6A is shown in the stressed state in FIG. 6C. FIGS. 6B and 6D show the ferrule 10 and the central member 14C of FIGS. 6A and 6C in the relaxed state, respectively.

FIGS. 7A through 7D show, respectively, similar structures to those shown in FIGS. 6A through 6D, with the addition of a coating 15 on the exterior of the central member 14C. The coating 15 may be a rose metal, a low melting point metal, a thermosetting adhesive compound, or a hot melt adhesive. As used herein, "low melting point" meaning temperatures below the transformation temperature of the central member 14C in cases wherein the central member 14C comprises a memory alloy, or temperatures which could affect the optical properties of the optical fibers. In some embodiments, the coating 15 may provide a locking mechanism for the central member 14C and optical fibers 12. For example, the temperature of the coating 15 may be raised above its melting point during assemblage of the optical fibers 12 within the ferrule 10. The coating 15 may thereby fill interstitial spaces or voids between and around central member 14C and optical fibers 12. After central member 14C returns to a relaxed state, the temperature of coating 15 may be lowered below its melting point, thereby solidifying the arrangement of central member 14C and optical fibers 12.

Figure 8:
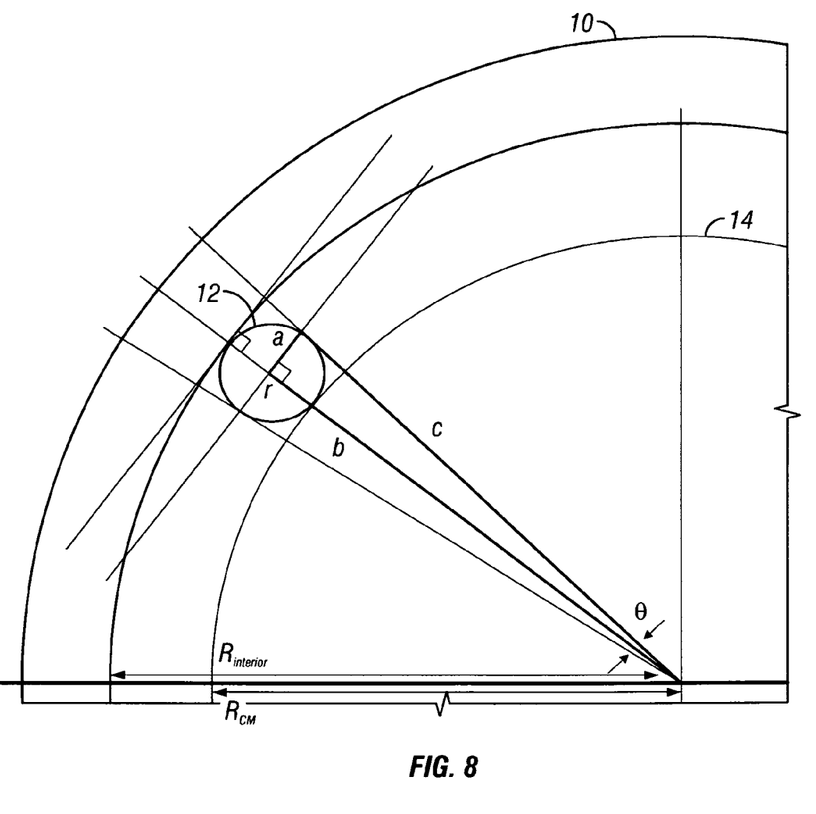
FIG. 8 illustrates parameters useful in calculating the dimensions of the central member and the ferrule given a selected number of optical fibers and dimensions of the fibers.

As previously mentioned, the dimensions of the ferrule 10 and central member 14 may be determined by the number and dimensions of required optical fibers 12. FIG. 8 provides an illustration helpful in determining appropriate dimensions in embodiments wherein the radius of the optical fiber is small compared to the interior radius of the ferrule. In such embodiments, for a given number of optical fibers x to be arranged in a ring, the arc angle θ of the ring occupied by each of the optical fibers is approximated by:

$$\theta \approx \frac{360°}{x} \qquad \text{(Eq. 1)}$$

In many embodiments, the number of optical fibers will range between 3 and 100. In some embodiments, the number of optical fibers will range between 7 and 24. This approximation holds well for embodiments with at least 6 optical fibers.

For a known radius r of each optical fiber, the minimum interior radius of the ferrule $R_{interior}$ would then be:

$$R_{interior} \approx \frac{r}{\tan\frac{\theta}{2}} + r \qquad \text{(Eq. 2)}$$

The radius of optical fibers will typically range from about 10 μm to about 100 μm (about 0.01 mm to about 0.10 mm), resulting in a typical range for $R_{interior}$ of between about 27 μm and about 3,282 μm (about 0.03 mm to about 3.28 mm). Similarly, the maximum exterior radius of the central member $R_{CM}$ (when in a relaxed state) would be:

$$R_{CM} = \frac{r}{\tan\frac{\theta}{2}} - r \quad \text{(Eq. 3)}$$

resulting in a typical range for $R_{CM}$ of between about 70 μm and about 30,900 μm (about 0.07 mm to about 31 mm).

When the central member 14 is a wire or rod, the change in diameter in one dimensional axial stress may be expressed in terms of the Poisson ratio of the central member material. For example, the diameter change of the central member under stress Δd may be given by the following expression:

$$\Delta d = -d\left(1 - \left(1 + \frac{\Delta L}{L}\right)\right)^{-\nu} \quad \text{(Eq. 4)}$$

wherein d is relaxed diameter of the central member, ν is Poisson's ratio for the rod material (example Poisson ratio of 0.33), L is the original length of the rod in the relaxed state, and ΔL is the change of length (e.g., 8% elongation).

The typical end face on an optical ferrule of the nature described is flat and normal to the optical fibers exiting the ferrule. A well know method of reducing optical back reflection in a ferrule to ferrule optical connection is to provide an angled end face, usually about 8 degrees from normal to the axis of the exiting optical fibers This method is also known as "angle polishing". The two ferrules are then aligned axially with the two angled end face in parallel plains. This configuration may be employed in certain embodiments of the invention.

Figure 9:
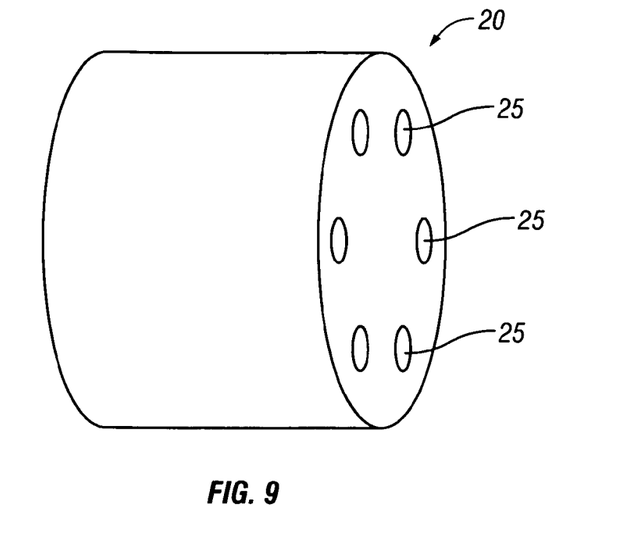
FIG. 9 shows an example optical connector having multiple optical fiber cavities.
Figure 10:
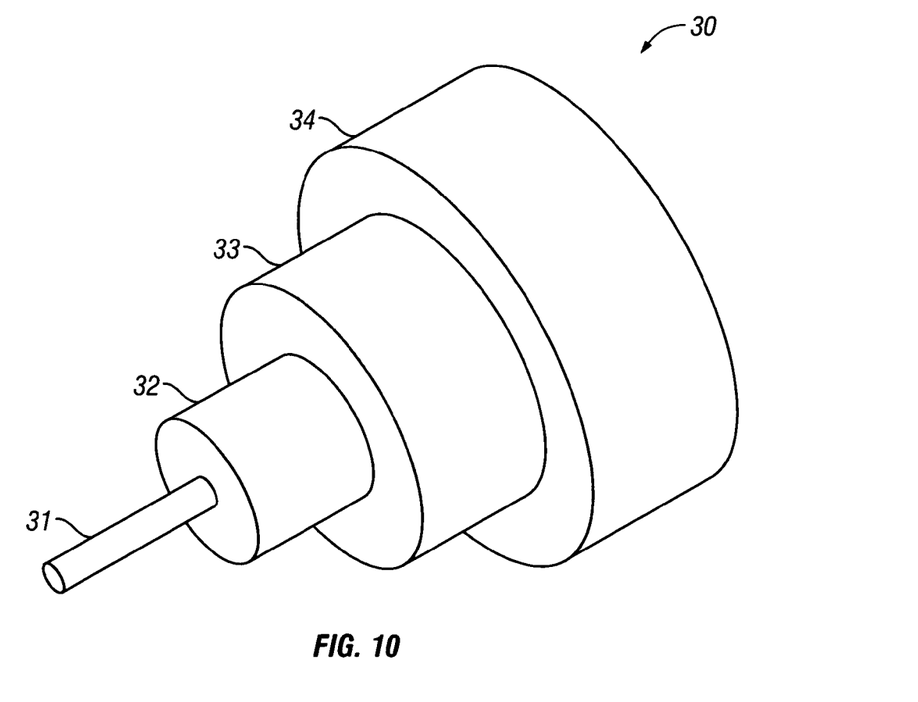
FIG. 10 shows an example optical fiber having a core, cladding, buffer, and an outer jacket.

Ferrules for optical connectors and connectors made according to the various aspects of the invention may enable inclusion of more optical fibers in a particular optical connector without having to increase the size of the optical connector. For example, as illustrated in FIG. 9, optical connector 20 may have multiple optical fiber cavities 25. As would be understood by one of ordinary skill in the art with the benefit of this disclosure, an optical fiber may be either single mode or multi mode, and may comprise several concentric layers. FIG. 10 illustrates a typical optical fiber 30, having a core 31, a cladding 32, a buffer 33, and an outer jacket 34. When the optical fiber 30 is single mode, the core 31 will typically be about 8 μm in diameter, while a multi mode optical fiber will typically have a core 31 of about 62.5 μm in diameter. The cladding 32 will have a diameter of about 125 μm for both single mode and multi mode optical fibers. Depending on the application, the diameter of the buffer 33 may range anywhere from about 250 μm to about 500 μm. If used, the diameter of the outer jacket 34 may range anywhere from about 400 μm to about 2.0 mm. Consequently, in many standard optical connectors 20, the cavity 25 may be designed accept an optical terminus (an optical fiber enclosed in a ferrule) of any one of the three standard sizes: 1.5 mm, 2.0 mm, and 2.5 mm. For a grouping of 12 optical fibers, each of about 125 μm diameter, a ferrule according to embodiments of the invention could have an interior diameter of about 590 μm (0.59 mm). Consequently, utilizing ferrules according to embodiments of the invention would convert optical connector 20 from a 6-fiber connector to a 72-fiber connector using the existing optical termini cavities.

It should be appreciated that ferrules for optical connectors may have applicability in many fields which utilize optical data transmission. For example, ferrules for optical connectors may be utilized in geophysical surveys of subterranean formations. In a specific embodiment, ferrules for optical connectors may facilitate data transmission in electromagnetic survey cables for marine geophysical surveys. In such embodiments, the geophysical survey could utilize ferrules which are smaller, less complex, more reliable, and more cost efficient than conventional ferrules.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A ferrule structure comprising:
   a ferrule;
   a central member disposed in the ferrule, wherein the central member is configured so that an exterior dimension of the central member can change between a smaller size and a larger size and an axial load on the central member causes the exterior dimension to assume the smaller size; and
   a plurality of optical fibers disposed in the ferrule external to the central member.

2. The structure of claim 1 further comprising an orientation key.

3. The structure of claim 1, wherein the central member is configured so that, when the exterior dimension of the central member is the larger size, the central member applies a radial force to the optical fibers against an interior of the ferrule.

4. The structure of claim 1, wherein the plurality of optical fibers are disposed in a fiber ribbon, the fiber ribbon being disposed around the central member.

5. The structure of claim 1, wherein the central member comprises at least one structure selected from the group consisting of a solid wire, a tube, a straight wire, a helically wound wire, a shape memory alloy structure, a Nitinol structure, an elastic nanostructure structure, a rigid epoxy structure, an injection-molded structure, and any combination thereof.

6. The structure of claim 1 further comprising a coating disposed externally to the central member.

7. The structure of claim 6, wherein the coating comprises at least one compound selected from the group consisting of: a hot melt adhesive, a thermosetting adhesive compound, a rose metal, a low melting point metal, and any combination thereof.

8. The structure of claim 1, wherein the ferrules ferrule is disposed in an optical connector.

9. A method for assembling an optical connector ferrule, comprising:
   providing a central member, wherein the central member is configured so that an exterior dimension of the central member can change between a smaller size and a larger size;
   placing an axial load on the central member to cause the exterior dimension to assume the smaller size;
   disposing the central member in the ferrule;
   disposing a plurality of optical fibers in the ferrule, wherein the optical fibers are disposed external to the central member;
   and removing the axial load from the central member.

10. The method of claim 9 further comprising:
    determining an orientation of the optical fibers in the ferrule; and
    applying an orientation key to the ferrule.

11. The method of claim 10, wherein the applying comprises at least one action selected from the group consisting of: crimping, swaging, adhesively bonding, and any combination thereof.

12. The method of claim 9 further comprising applying a coating to at least a portion of the central member, wherein the coating comprises at least one compound selected from the group consisting of: a hot melt adhesive, a thermosetting adhesive compound, a rose metal, a low melting point metal, and any combination thereof.

13. The method of claim 9 further comprising disposing the ferrule in an optical connector.

14. An optical connector for marine geophysical surveys comprising:
    at least one ferrule, each ferrule comprising:
        a central member disposed in the ferrule, wherein the central member is configured so that an exterior dimension of the central member can change between a smaller size and a larger size, and an axial load on the central member causes the exterior dimension to assume the smaller size; and
        a plurality of optical fibers disposed in the ferrule external to the central member.

15. The optical connector of claim 13, wherein each ferrule further comprises an orientation key.

16. The optical connector of claim 13, wherein each central member is configured so that, when the exterior dimension of the central member is the larger size, the central member applies a radial force to the corresponding optical fibers against an interior of the corresponding ferrule.

17. The optical connector of claim 13, wherein each plurality of optical fibers are disposed in a fiber ribbon, the fiber ribbon being disposed around the corresponding central member.

18. The optical connector of claim 13, wherein each central member comprises at least one structure selected from the group consisting of: a solid wire, a tube, a straight wire, a helically wound wire, a shape memory alloy structure, a Nitinol structure, an elastic nanostructure structure, a rigid epoxy structure, an injection-molded structure, and any combination thereof.

19. The optical connector of claim 13, wherein each ferrule further comprises a coating disposed externally to the corresponding central member, wherein the coating comprises at least one compound selected from the group consisting of: a hot melt adhesive, a thermosetting adhesive compound, a rose metal, a low melting point metal, and any combination thereof.

20. The ferrule structure of claim 1, wherein the ferrule structure comprises from between 7 to about 24 of the optical fibers, wherein the optical fibers have a radius ranging from about 0.01 millimeters to about 0.1 millimeters, and wherein a maximum exterior radius of the central member when in a relaxed state ranges from about 0.07 millimeters to about 31 millimeters.

* * * * *